(12) United States Patent
Wei et al.

(10) Patent No.: US 12,721,276 B2
(45) Date of Patent: Sep. 1, 2026

(54) GARDEN TOOLS TRAVEL DRIVING MECHANISM AND THE GARDEN TOOLS WITH SUCH A MECHANISM

(71) Applicant: Greenworks (Jiangsu) Co. Ltd., Changzhou (CN)

(72) Inventors: Qunli Wei, Changzhou (CN); Dongdong Shi, Changzhou (CN)

(73) Assignee: GREENWORKS (JIANGSU) CO. LTD. (CN)

( * ) Notice: Subject to any disclaimer, the term of this patent is extended or adjusted under 35 U.S.C. 154(b) by 273 days.

(21) Appl. No.: 18/558,621

(22) PCT Filed: Nov. 15, 2022

(86) PCT No.: PCT/CN2022/131828

§ 371 (c)(1), (2) Date: Nov. 2, 2023

(87) PCT Pub. No.: WO2023/088222

PCT Pub. Date: May 25, 2023

(65) Prior Publication Data

US 2024/0215491 A1 Jul. 4, 2024

(30) Foreign Application Priority Data

Nov. 17, 2021 (CN) ......................... 202122825381.5

(51) Int. Cl.
*A01D 69/02* (2006.01)
*A01D 69/06* (2006.01)
(Continued)

(52) U.S. Cl.
CPC ............. *A01D 69/02* (2013.01); *A01D 69/06* (2013.01); *A01D 69/10* (2013.01); *B60K 7/0007* (2013.01);
(Continued)

(58) Field of Classification Search
CPC .... H01M 4/661; H01M 4/0404; H01M 4/131; H01M 4/667; H01M 4/747;
(Continued)

(56) References Cited

U.S. PATENT DOCUMENTS

2021/0146771 A1 5/2021 Zhu

FOREIGN PATENT DOCUMENTS

| CN | 202251725 | 5/2012 |
|---|---|---|
| CN | 208369397 | 1/2019 |

(Continued)

OTHER PUBLICATIONS

CN208369397U—Wang—English Translation (Year: 2019).*
(Continued)

*Primary Examiner* — Scott A Reinbold
(74) *Attorney, Agent, or Firm* — Shumaker, Loop & Kendrick, LLP; Brandon C. Trego

(57) ABSTRACT

The present invention belongs to the technical field of garden tools, and particularly relates to a garden tools travel driving mechanism and garden tools, the garden tools travel driving mechanism comprises: traveling wheels; a driving motor; and a speed reducer, the power input end of the speed reducer is connected with the driving motor, the power output end of the speed reducer is connected with the traveling wheels, and the speed reducer is arranged in an axial space at the center of the traveling wheels. The speed reducer can increase the output torque of the driving motor, so that the power and the size of the driving motor can be reduced on the premise of ensuring sufficient power. Meanwhile, the speed reducer is arranged in the central axial space of the traveling wheels and is used as a supporting shaft of the traveling wheels. The space utilization rate is improved, the overall transverse width of the mower is
(Continued)

reduced, and the mower has a better motion flexibility on the premise of meeting the design requirement of the power.

9 Claims, 5 Drawing Sheets

(51) Int. Cl.

| | |
|---|---|
| ***A01D 69/10*** | (2006.01) |
| ***B60K 7/00*** | (2006.01) |
| ***B60K 17/04*** | (2006.01) |
| ***B60L 50/60*** | (2019.01) |
| ***B60T 1/06*** | (2006.01) |
| ***B60T 13/74*** | (2006.01) |
| ***F16H 1/46*** | (2006.01) |

(52) U.S. Cl.
CPC ............ *B60K 17/046* (2013.01); *B60L 50/60* (2019.02); *B60T 1/065* (2013.01); *B60T 13/741* (2013.01); *F16H 1/46* (2013.01); *B60K 2007/0092* (2013.01)

(58) Field of Classification Search
CPC ............. H01M 50/141; H01M 50/491; H01M 2004/027; H01M 4/66; H01M 10/0525; Y02E 60/10
USPC ............................................................ 180/65
See application file for complete search history.

(56) References Cited

FOREIGN PATENT DOCUMENTS

| | | | | | |
|---|---|---|---|---|---|
| CN | 208369397 U | * | 1/2019 | | |
| CN | 210423601 | | 4/2020 | | |
| CN | 112554118 | | 3/2021 | | |
| CN | 113243190 | | 8/2021 | | |
| CN | 113243190 A | * | 8/2021 | ............. | A01D 69/02 |
| JP | 2018054120 | | 4/2018 | | |
| JP | 2018054120 A | * | 4/2018 | ............. | F16H 55/17 |

OTHER PUBLICATIONS

International Search Report and Written Opinion for International Patent Application No. PCT/CN2022/131828 issued on Jan. 28, 2023.

* cited by examiner

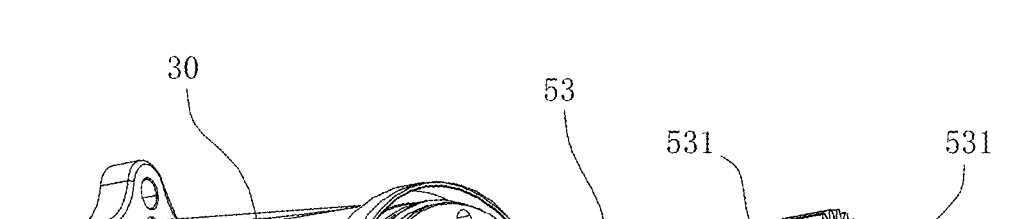
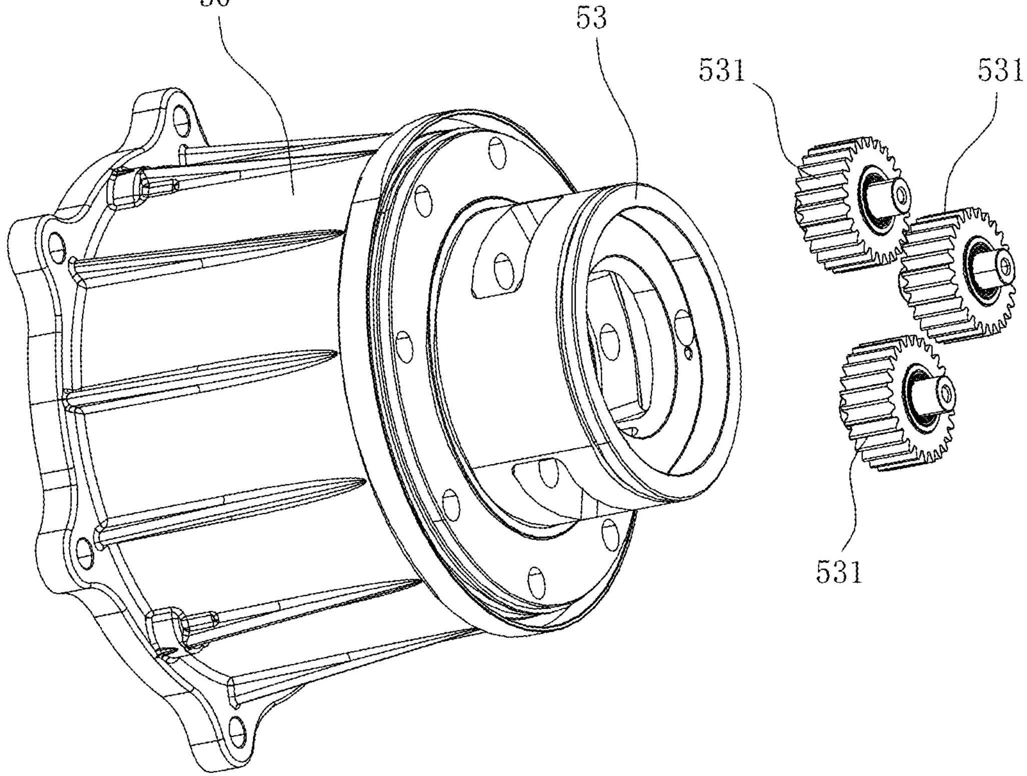
FIG. 5
54
542
541
FIG. 6

GARDEN TOOLS TRAVEL DRIVING MECHANISM AND THE GARDEN TOOLS WITH SUCH A MECHANISM technical field the present invention belongs to the technical field of garden tools, and particularly relates to a garden tools travel driving mechanism and the garden tools with such a mechanism.

BACKGROUND

Garden tools sometimes need to pass through a fence during working, and the width of the fence door is limited, hence the design width of the garden tools needs to be controlled within a certain range. An electrically-driven mower currently available in the market is generally driven by a parallel shaft gear box and a motor, and a problem for such a configuration is that the occupied space is large, and it is inconvenient to arrange other items of the mower. A driving mode of directly driving the wheels with a motor also exists in the art, which saves the space by omitting the speed reducer. Nevertheless, the motor is limited by the size of the wheels in such a configuration, and the power of the motor is limited, and therefore it is difficult to meet the power requirement of the garden tools.

SUMMERY OF THE INVENTION

In view of the above-mentioned disadvantages of the prior art, the object of the present invention is to provide a garden tools travel driving mechanism and the garden tools with such a mechanism, which can reduce the lateral size of the driving mechanism while satisfying the power requirement.

To achieve the above and other related objects, the present invention provides a garden tools travel driving mechanism, comprising:

traveling wheels;

a driving motor; and a speed reducer, the power input end of the speed reducer is connected with the driving motor, the power output end of the speed reducer is connected with the traveling wheels, and the speed reducer is arranged in an axial space in the center of the traveling wheels.

In an alternative embodiment of the present invention, the speed reducer is a planetary reducer.

In an alternative embodiment of the present invention, the speed reducer comprises:

a mandrel arranged at the center of the traveling wheels along the axial direction of the traveling wheels, a first sun gear arranged on the mandrel, and the first sun gear is coaxially secured to the mandrel;

a first planet wheel bracket rotationally connected with the mandrel, a first plurality of planet wheels and a second sun wheel arranged on the first planet wheel bracket, the first plurality of planet wheels are rotationally connected with the first planet wheel bracket, the first plurality of planet wheels are engaged with the first sun wheel, and the second sun wheel is coaxially secured to the first planet wheel bracket;

a second planet wheel bracket fixedly arranged relative to the housing of the driving motor, a second plurality of planet wheels rotatably arranged on the second planet wheel bracket, wherein the second plurality of planet wheels are engaged with the second sun wheel;

a rotation support secured to the traveling wheels, a first inner gear ring and a second inner gear ring arranged on the rotation support, wherein a first inner gear ring and a second inner gear ring are arranged with an interval along the axial direction, the first inner gear ring is engaged with the first plurality of planet wheels, and the second inner gear ring is engaged with the second plurality of planet wheels.

In an alternative embodiment of the present invention, the mandrel is connected to the main shaft of the driving motor by a spline in a synchronous rotation manner.

In an alternative embodiment of the present invention, the rotation support comprises a cylindrical side wall and an end cover, wherein the cylindrical side wall is rotatably connected with the second planet wheel bracket through a bearing, and the end cover is fixed at one end of the cylindrical side wall which is distal from the driving motor.

In an alternative embodiment of the present invention, one end of the mandrel is rotatably connected with the end cover through a bearing, and the other end of the mandrel is rotatably connected with the second planet wheel bracket through a bearing.

In an alternative embodiment of the present invention, a sliding seal ring is disposed between the cylindrical sidewall and the housing of the driving motor.

In an alternative embodiment of the present invention, each traveling wheel comprises a hub and a tire, wherein a flange plate is arranged on an inner annular surface of the hub, and the flange plate is detachably fixed to the rotation support.

In an alternative embodiment of the present invention, at least a part of the driving motor protrudes into the axial space in the center of the traveling wheels.

In an alternative embodiment of the present invention, the garden tools travel driving mechanism further comprises a brake disposed on a side of the driving motor opposite to the speed reducer.

In an alternative embodiment of the present invention, the brake is an electromagnetic brake, and the brake includes a moving friction plate connected to the main shaft of the driving motor in a synchronous rotation manner, a fixed friction plate fixed to the housing of the driving motor, and an electromagnetic driver for driving the moving friction plate to approach to or depart from the fixed friction plate.

To achieve the above and other related objects, the present invention also provides garden tools, comprising:

a body;

traveling wheels positioned on two sides of the body;

a driving motor secured to the body;

a power battery connected with the driving motor; and a speed reducer, wherein the power input end of the speed reducer is connected with the driving motor, the power output end of the speed reducer is connected with the traveling wheels, and the speed reducer is arranged in an axial space in the center of the traveling wheels.

The present invention has the following technical effects:

The speed reducer can increase the output torque of the driving motor, so that the power and the size of the driving motor can be reduced on the premise of ensuring sufficient power. Meanwhile, the speed reducer is arranged in the central axial space of the traveling wheels and is used as a supporting shaft of the traveling wheels, therefore the space utilization rate is improved, the overall transverse width of the mower is reduced, and the mower has a better motion flexibility on the premise of meeting the design requirement of the power.

The planetary speed reducer can generate a larger speed reduction transmission ratio with a smaller axial size, and the axial length of the planetary speed reducer can even be smaller than the width of the traveling wheels, so that the speed reducer can be completely hidden in the traveling wheels, and the transverse space utilization rate of the mower is greatly improved.

The present invention is provided with two groups of planetary gear mechanisms, and the inner gear rings of the two groups of planetary gear mechanisms are secured to the rotation support, so that the two groups of planetary gear mechanisms can be driven from both ends of the rotation support, and the power distribution is more uniform. In addition, differential cooperation between two sets of planet wheels realizes a two-stage speed reduction from the driving motor to the travel wheels, with a higher transmission ratio and a more remarkable torque promotion.

DRAWINGS

FIG. 5 is an exploded view of the second planet wheel bracket and the second planet wheel bracket provided by an embodiment of the present invention;

FIG. 6 is a perspective view of a rotation support provided by an embodiment of the present invention;

DETAILED DESCRIPTION

Figure 1:
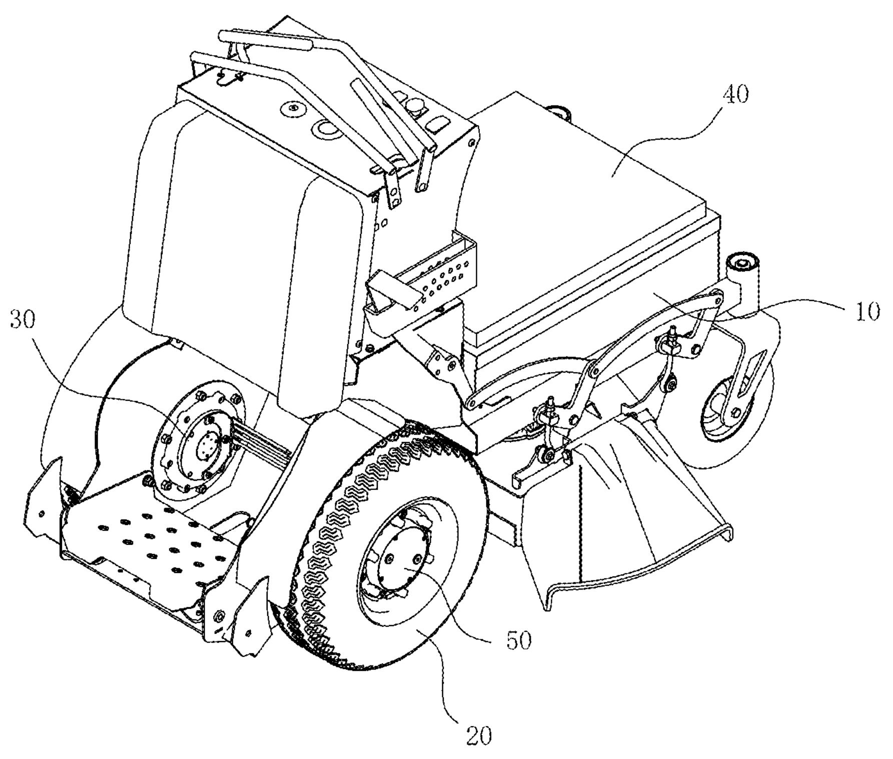
FIG. 1 is a schematic perspective view of a mower provided by an embodiment of the present invention.

The present invention is described below with reference to specific embodiments, and other advantages and effects of the present invention will be easily understood by those skilled in the art from the disclosure of the present specification. The present invention can be implemented or practiced with other different embodiments, and its details can be adapted or modified according to different viewpoints or applications without departing from the spirit of the present invention. It is to be noted that the features in the following embodiments and examples may be combined with each other without a conflict.

It should be further noted that the drawings provided below are only for illustrating the basic idea of the present invention, and the drawings only show the components related to the present invention rather than the number, shape and size of the components in an actual implementation. The type, quantity and scale of the components in an actual implementation may be changed freely, and the layout of the components may be more complicated.

Referring to FIGS. 1-6, the present invention is described in details with reference to the application of a travel driving mechanism in a mower. It should be understood that the embodiments of the present invention only illustrate some application scenarios of the travel driving mechanism, and actually, the travel driving mechanism of the present invention can also be applied to snow plows, floor sweepers, hedge trimmers, and other garden tools.

Referring to FIGS. 1-6, a mower includes a body 10, traveling wheels 20, a driving motor 30, a power battery 40, a speed reducer 50, and necessary mowing mechanisms, a control mechanism, a control module, etc.

Referring to FIGS. 1 to 6, in the illustrated embodiment of the present invention, the body 10 is a standing mower body 10, i.e., an operator stands on the mower to perform a mowing operation, and it is understood that the travel driving mechanism of the present invention can be applied to other types of mowers such as riding mowers and walk-behind mowers.

Referring to FIGS. 1, 2, 4 and 6, the traveling wheels 20 are located on two sides of the body 10, and in a specific embodiment, the traveling wheels 20 may be, for example, pneumatic wheels composed of tires 21 and hubs 22, or integral wheels made of high molecular polymers, and the structure of the wheels is not limited to a certain form. However, it is required that the wheel center has a cavity capable of accommodating the speed reducer 50 and even the driving motor 30.

Referring to FIGS. 2-5, the driving motor 30 is secured to the body 10. It is understood that the driving motor 30 of the present invention is not only used as a driving element, but also used as a supporting structure for connecting the traveling wheels 20 and the body 10. And therefore, the housing of the driving motor 30 should have sufficient structural strength. For example, cast iron, cast aluminum, etc. can be used as the housing material of the driving motor 30.

Referring to FIGS. 1 to 6, a power input end of the speed reducer 50 is connected to the driving motor 30, a power output end of the speed reducer 50 is connected to the traveling wheel 20, and the speed reducer 50 is disposed in an axial space in the center of the traveling wheels 20. It can be understood that the speed reducer 50 can increase an output torque of the driving motor 30, thereby can reduce the power and the size of the driving motor 30 on the premise of ensuring a sufficient power. Meanwhile, the speed reducer 50 is disposed in the central axial space of the traveling wheels 20 and is used as a support shaft of the traveling wheels 20, thereby improving a space utilization rate, reducing an overall transverse width of the mower, and enabling the mower to have a better motion flexibility on the premise of meeting the design requirements of the power.

Figure 3:
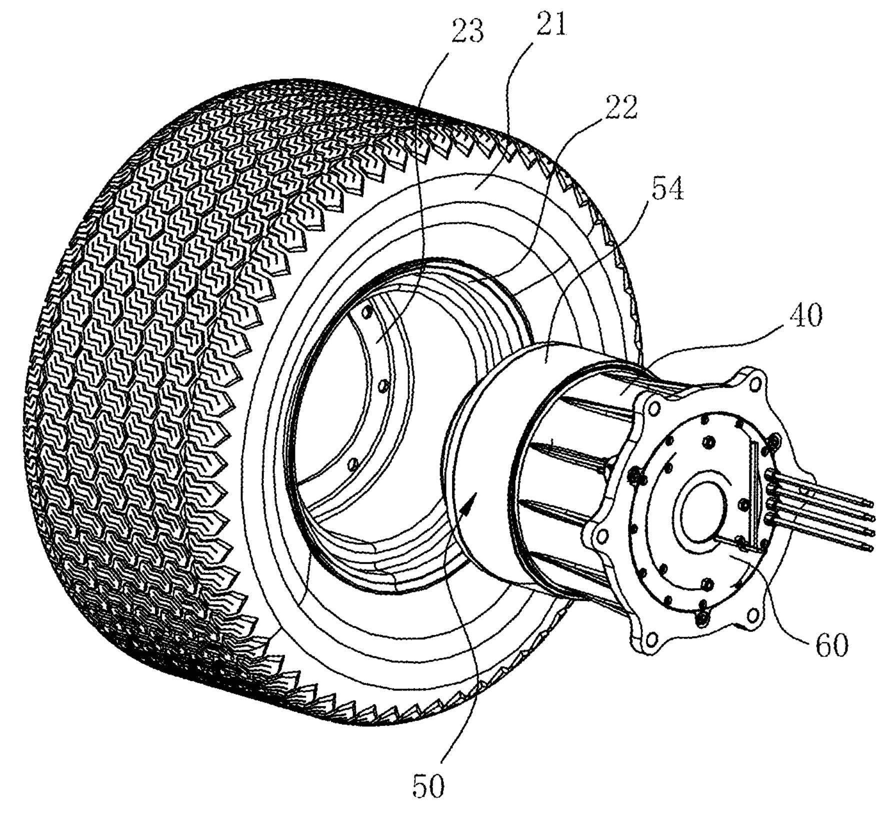
FIG. 3 is an exploded view of a travel driving mechanism provided by an embodiment of the present invention.
Figure 4:
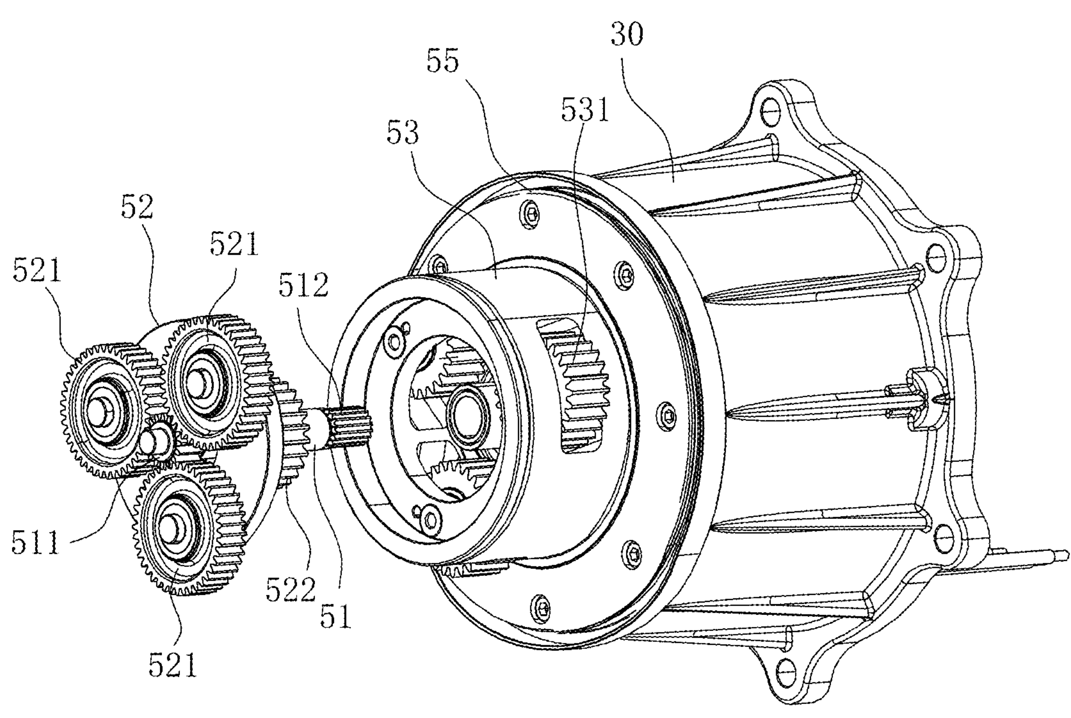
FIG. 4 is an exploded view of the internal structure of the speed reducer provided by an embodiment of the present invention.
Figure 7:
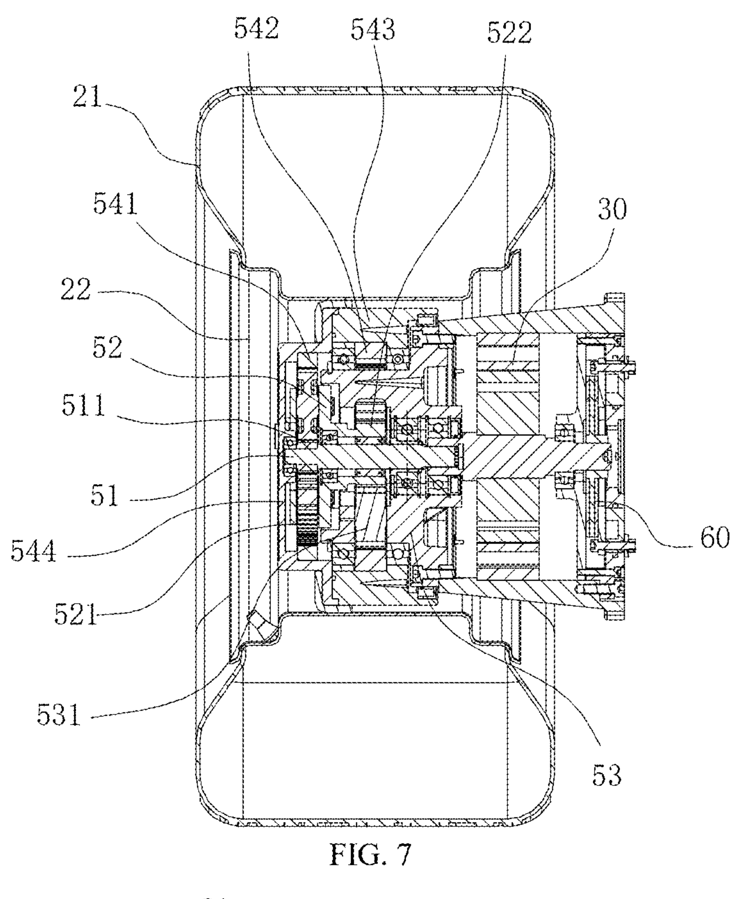
FIG. 7 is a cross-sectional view of a travel driving mechanism provided by an embodiment of the present invention.
Figure 8:
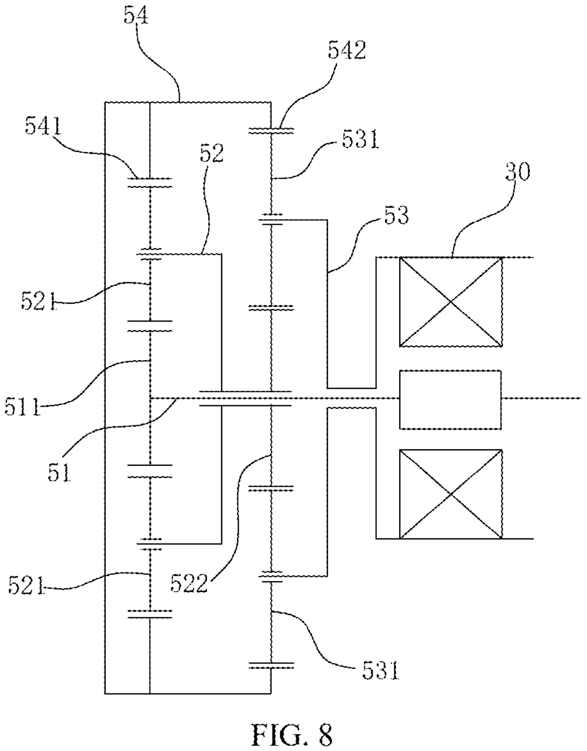
FIG. 8 is a schematic diagram of a speed reducer provided by an embodiment of the present invention.
Figure 9:
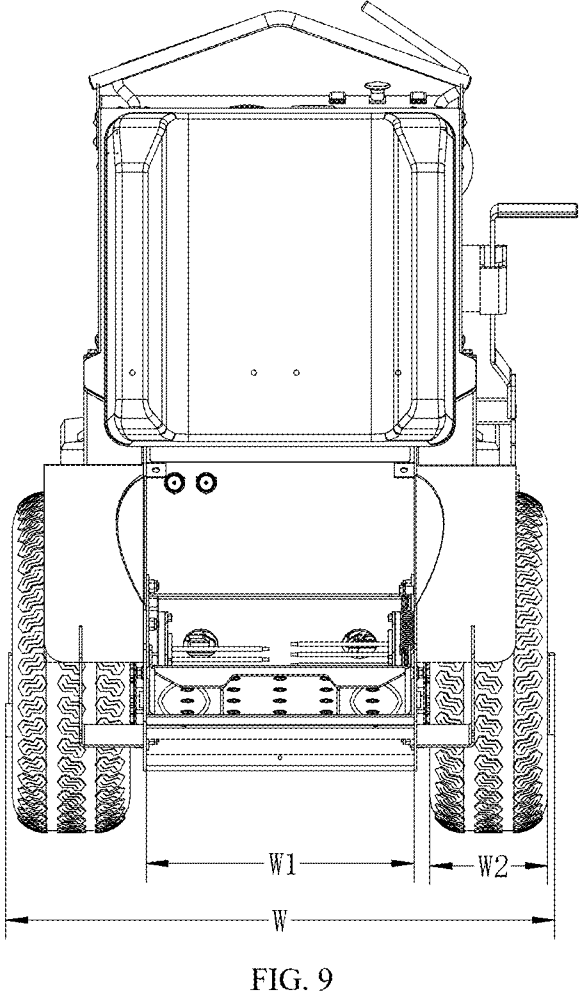
FIG. 9 is a rear view of a mower provided by an embodiment of the present invention.

Referring to FIGS. 3-5, the speed reducer 50 is a planetary speed reducer with characteristics that a larger speed reduction transmission ratio can be generated with a smaller axial size, and the axial length of the planetary speed reducer can be even smaller than the width of the traveling wheels 20, so that the speed reducer 50 can be completely hidden in the traveling wheels 20, and the transverse space utilization rate of the mower can be greatly improved.

Referring to FIGS. 3-5, in a further embodiment of the present invention, the reducer 50 includes a mandrel 51, a first planet wheel bracket 52, a second planet wheel bracket 53, and a rotation support 54. The mandrel 51 is arranged at the center of the traveling wheels 20 along the axial direction of the traveling wheels 20. A first sun gear 511 is arranged on the mandrel 51, and the first sun gear 511 is coaxially secured to the mandrel 51. The first planet wheel bracket 52 is rotationally connected with the mandrel 51, and a plurality of first planet wheels 521 and a second sun wheel 522 are arranged on the first planet wheel bracket 52. The first planet wheels 521 are rotationally connected with the first planet wheel bracket 52, and the first planet wheels 521 are engaged with the first sun wheel 511. The second sun wheel 522 is further coaxially secured to the first planet wheel bracket 52. The second planet wheel bracket 53 is fixedly arranged relative to the housing of the driving motor 30. A plurality of second planet wheels 531 are rotatably arranged on the second planet wheel bracket 53, and the second planet wheels 531 are engaged with the second sun gear 522. The rotation support 54 is secured to the traveling wheels 20 and a first inner gear ring 541 and a second inner gear ring 542 are arranged on the rotation support 54. The first inner gear ring 541 and the second inner gear ring 542 are secured to the rotation support 54 through interference fit or fixing pins, bolts and the like, so that the rotation support 54 is driven to rotate. The first inner gear ring 541 and the second inner gear ring 542 are arranged with an interval along the axial direction, and the first inner gear ring 541 is engaged with the first planet wheels 521, and the second inner gear ring 542 is engaged with the second planet wheels 531.

It can be understood that, in the embodiment of the present invention, the speed reducer 50 is different from a conventional planetary speed reducer, and two sets of planetary wheel mechanisms are provided in the present application, wherein the inner gear rings (i.e. the first inner gear ring 541 and the second inner gear ring 542) of the two sets of planetary wheel mechanisms are secured to the rotation support 54, so that the rotation support 54 can be driven from both ends thereof, and power distribution is more uniform. In addition, the differential cooperation between the two groups of planet wheels realizes two-stage speed reduction from the driving motor 30 to the traveling wheels 20 with a higher transmission ratio and a more remarkable torque promotion.

Referring to FIGS. 3 and 4, the mandrel 51 is connected to the main shaft of the driving motor 30 by a spline 512 for a synchronous rotation. The rotation support 54 includes a cylindrical sidewall 543 and an end cover 544. The cylindrical sidewall 543 is rotatably connected to the second planet wheel bracket 53 through a bearing, and the end cover 544 is fixed to one end of the cylindrical sidewall 543 distal from the driving motor 30. One end of the mandrel 51 is rotatably connected to the end cover 544 through a bearing, and the other end of the mandrel is rotatably connected to the second planet wheel bracket 53 through a bearing. In the embodiment of the present invention, the second planet wheel bracket 53 and the housing of the driving motor 30 can be integrally formed, and both are the same component. For example, a protruding structure is directly arranged at the front end of the housing of the driving motor 30, and the second planet wheels 531 are directly mounted on the protruding structure, so that the assembly process can be simplified, the material can be saved, the cost can be reduced, and the assembly structure can be simplified. The second planet wheel bracket 53 can be fixed as long as the housing of the driving motor 30 is fixed on the body. In addition, the second planet wheel bracket 53 and the housing of the driving motor 30 can be formed separately and then connected into a whole by welding, riveting, bolting and other means.

Referring to FIG. 3, a sliding seal ring 55 is disposed between the cylindrical sidewall and the housing of the driving motor 30. It can be understood that the cylindrical sidewall, the end cover and the housing of the driving motor 30 can enclose a closed gear box, so that lubricant can be injected to improve the transmission efficiency of the speed reducer 50.

Figure 2:
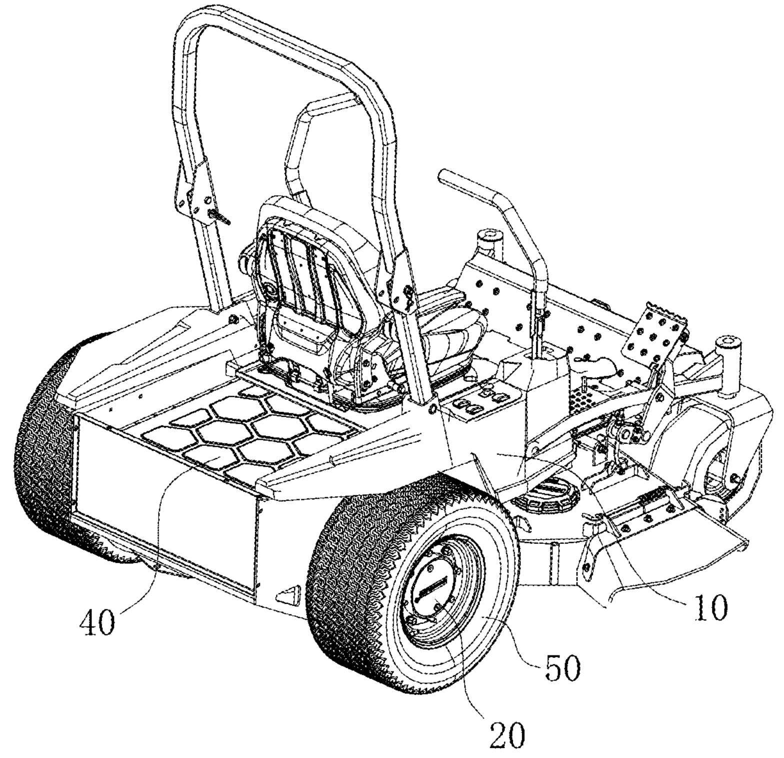
FIG. 2 is a schematic perspective view of a mower by another embodiment of the present invention.

Referring to FIG. 2, a flange 23 is disposed on an inner annular surface of the hub 22, and the flange 23 is detachably fixed to the rotation support 54. Although the present invention adopts a new transmission structure, the installation mode of the travel wheels 20 is basically the same as that of common wheels, thus being convenient for disassembly, assembly and maintenance.

Referring to FIG. 4, at least a part of the driving motor 30 protrudes into an axial space in the center of the traveling wheels 20. The driving mechanism further includes a brake 60 disposed on a side of the driving motor 30 opposite to the speed reducer 50. The brake 60 is an electromagnetic brake 60 including a moving friction plate which is synchronously connected with the main shaft of the driving motor 30 in a rotating manner, a fixed friction plate which is fixed relative to the housing of the driving motor 30, and an electromagnetic driver which is used for driving the moving friction plate to approach to or depart from the fixed friction plate. The present invention adopts the electromagnetic brake 60 for braking which has a smaller axial size and can further save the transverse space of the mower.

In conclusion, the speed reducer 50 can increase the output torque of the driving motor 30, so that the power and the size of the driving motor 30 can be reduced on the premise of ensuring sufficient power. Meanwhile, the speed reducer 50 is arranged in the central axial space of the traveling wheels 20, and the speed reducer 50 is used as a supporting shaft of the traveling wheels 20, so that the space utilization rate is improved, the overall transverse width of the mower is reduced, and the mower has a better motion flexibility on the premise of meeting the design requirements of the power. The planetary reducer can generate a higher reduction transmission ratio with a smaller axial size, and the axial length of the planetary reducer can even be smaller than the width of the traveling wheels 20, so that the speed reducer 50 can be completely hidden in the traveling wheels 20, and the transverse space utilization rate of the mower is greatly improved. As shown in FIG. 1, for a standing mower, the interference between the driving motor 30 and the reducer 50 is avoided, and the pedal can extend forwards to increase the standing space of an operator. When an operator stands on the pedal, the gravity center of a human body is positioned on the center of the rotating axis of the traveling wheels 20 of the standing mower, so that when the standing mower turns in place, there is no rotating radius and the centrifugal force is avoided, and the human body is not in danger of being thrown away. In addition, by moving the pedals forward, the gravity center of the human body also moves forward correspondingly, and the stand mower can be safer and is not easy to overturn no matter climbing or passing through a hollow ground. As shown in FIG. 2, for a riding mower, the power battery 40 may be installed to a lower position, and the center of gravity of the power battery 40 may be lowered, such that the stability of the body may be improved. Due to the lowered installation position, one end of the power battery 40 may extend forward to below the seat of the riding mower. The present invention is provided with two groups of planetary gear mechanisms, and the inner gear rings of the two groups of planetary gear mechanisms are secured to the rotation support 54, so that the two groups of planetary gear mechanisms can be driven from both ends of the rotation support 54, and the power distribution is more uniform. In addition, the differential cooperation between the two groups of planet wheels realizes a two-stage speed reduction from the driving motor 30 to the traveling wheels 20 with a higher transmission ratio and a more remarkable torque promotion.

Referring to FIG. 6, the overall weight of the mower provided by the present invention can be up to 550 kg at most. The width W2 of the tires can be selected as no more than 180 mm in consideration of the load of the tires. The width W of the whole machine is not more than 33 inches (838.2 mm), and the width W1 for a person to stand is at least more than 400 mm. The operator will not feel crowded when he stands on the standing pedal.

The foregoing embodiments are merely illustrative of the principles and effects of the present invention and are not intended to limit the present invention. Any person skilled in the art can modify or change the above-mentioned embodiments without departing from the spirit and scope of the present invention. Accordingly, it is intended that all equivalent modifications or changes which can be made by those skilled in the art without departing from the spirit and technical idea of the present invention are to be covered by the claims of the present invention.

In the description herein, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not shown or described in details to avoid obscuring aspects of embodiments of the present invention.

Reference throughout this specification to "one embodiment," "an embodiment," or "a specific embodiment" means that a particular feature, structure, or characteristic described in connection with the embodiment is included in at least one embodiment, and not necessarily in all embodiments, of the present invention. Thus, appearances of the phrases of "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements shown in the figures can also be implemented in a more separated or integrated manner, or even removed for inoperability in some circumstances or provided for usefulness in accordance with a particular application.

Additionally, any reference arrows in the drawings/figures should be considered only as exemplary, and not limiting, unless otherwise expressly specified. Further, as used herein, the term "or" is generally intended to mean "and/or" unless otherwise indicated. Combinations of components or steps will also be considered as being noted where terminology is foreseen as rendering the ability to separate or combine is unclear.

As used in the description herein and throughout the claims that follow, "a," "an," and "the" include plural references unless otherwise indicated. Also, as used in the description herein and throughout the claims that follow, the meaning of "in . . . " includes "in . . . " and "on . . . " unless otherwise indicated.

The above description of illustrated embodiments of the present invention, including what is described in the abstract of the specification, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

The systems and methods have been described herein in general terms as the details aid in understanding the present invention. Furthermore, various specific details have been given to provide a general understanding of the embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, and/or operations are not specifically shown or described in detail to avoid obscuring aspects of embodiments of the present invention.

Thus, although the present invention has been described herein with reference to particular embodiments thereof, a latitude of modification, various changes and substitutions are intended in the foregoing disclosures, and it will be appreciated that in some instances some features of the present invention will be employed without a corresponding use of other features without departing from the scope and spirit of the present invention as set forth.

Thus, many modifications may be made to adapt a particular situation or material to the essential scope and spirit of the present invention. It is intended that the present invention not be limited to the particular terms used in following claims and/or to the particular embodiment disclosed as the best mode contemplated for carrying out this invention, but that the present invention will include any and all embodiments and equivalents falling within the scope of the appended claims. Accordingly, the scope of the present invention is to be determined solely by the appended claims.

The invention claimed is:

1. A garden tools travel drive mechanism, comprising:

traveling wheels;

a driving motor; and a speed reducer, the power input end of the speed reducer is connected with the driving motor, the power output end of the speed reducer is connected with the traveling wheels, and the speed reducer is arranged in an axial space in the center of the traveling wheels, wherein at least a part of the driving motor protrudes into the axial space in the center of the traveling wheels; wherein the speed reducer is a planetary reducer and comprises:

a mandrel arranged at the center of the travelling wheels along the axial direction of the travelling wheels, a first sun gear arranged on the mandrel, and the first sun gear is coaxially secured to the mandrel;

the first planet wheel bracket rotationally connected with the mandrel, a first plurality of planet wheels and a second sun wheel are arranged on the first planet wheel bracket, the first plurality of planet wheels are rotationally connected with the first planet wheel bracket, the first plurality of planet wheels are engaged with the first sun wheel, and the second sun wheel is coaxially secured to the first planet wheel bracket;

the second planet wheel bracket is fixedly arranged relative to the housing of the driving motor, a second plurality of planet wheels rotatably arranged on the second planet wheel bracket, wherein the second plurality of planet wheels are engaged with the second sun wheel; and a rotation support secured to the traveling wheels, a first inner gear ring and a second inner gear ring arranged on the rotation support, wherein a first inner gear ring and a second inner gear ring are arranged with an interval along the axial direction, the first inner gear ring is engaged with the first plurality of planet wheels, and the second inner gear ring is engaged with the second plurality of planet wheels.

2. The garden tools travel driving mechanism of claim 1, wherein the mandrel is connected to the main shaft of the driving motor by a spline in a synchronous rotation manner.

3. The garden tools travel driving mechanism as defined in claim 1, wherein the rotation support comprises a cylindrical side wall and an end cover, wherein the cylindrical side wall is rotatably connected with the second planet wheel bracket through a bearing, and the end cover is fixed to one end of the cylindrical side wall which is distal from the driving motor.

4. The garden tools travel driving mechanism as defined by claim 3, wherein one end of the mandrel is rotatably connected to the end cover through a bearing, and the other end of the mandrel is rotatably connected to the second planet wheel bracket through a bearing.

5. The garden tools travel driving mechanism of claim 3, wherein a sliding seal is disposed between the cylindrical side wall and the housing of the driving motor.

6. The garden tools travel driving mechanism as defined in claim 1, wherein each traveling wheel comprises a hub and a tire, wherein a flange is arranged on an inner annular surface of the hub, and the flange is detachably fixed to the rotation support.

7. The garden tools travel driving mechanism of claim 1, further comprising a brake disposed on a side of the driving motor opposite the speed reducer.

8. The garden tools travel driving mechanism according to claim 7, wherein the brake is an electromagnetic brake, and the brake comprises a moving friction plate connected to the main shaft of the driving motor in a synchronous rotation manner, a fixed friction plate fixed to the housing of the driving motor, and an electromagnetic driver for driving the moving friction plate to approach to or depart from the fixed friction plate.

9. Garden tools, comprising:

a body;

traveling wheels positioned on two sides of the body;

a driving motor secured to the body;

a power battery connected with the driving motor; and a speed reducer, wherein the power input end of the speed reducer is connected with the driving motor, the power output end of the speed reducer is connected with the traveling wheels, and the speed reducer is arranged in an axial space in the center of the traveling wheels, wherein at least a part of the driving motor protrudes into the axial space in the center of the traveling wheels; wherein the speed reducer is a planetary reducer and comprises:

a mandrel arranged at the center of the travelling wheels along the axial direction of the travelling wheels, a first sun gear arranged on the mandrel, and the first sun gear is coaxially secured to the mandrel;

the first planet wheel bracket rotationally connected with the mandrel, a first plurality of planet wheels and a second sun wheel are arranged on the first planet wheel bracket, the first plurality of planet wheels are rotationally connected with the first planet wheel bracket, the first plurality of planet wheels are engaged with the first sun wheel, and the second sun wheel is coaxially secured to the first planet wheel bracket;

the second planet wheel bracket is fixedly arranged relative to the housing of the driving motor, a second plurality of planet wheels rotatably arranged on the second planet wheel bracket, wherein the second plurality of planet wheels are engaged with the second sun wheel; and a rotation support secured to the traveling wheels, a first inner gear ring and a second inner gear ring arranged on the rotation support, wherein a first inner gear ring and a second inner gear ring are arranged with an interval along the axial direction, the first inner gear ring is engaged with the first plurality of planet wheels, and the second inner gear ring is engaged with the second plurality of planet wheels.

* * * * *